Patented Mar. 25, 1930

1,751,783

UNITED STATES PATENT OFFICE

HAROLD E. WHITE, OF ANNISTON, ALABAMA, ASSIGNOR TO FEDERAL PHOSPHORUS COMPANY, OF BIRMINGHAM, ALABAMA, A CORPORATION OF ALABAMA

PROCESS FOR THE ELIMINATION OF SILICON IN FERROPHOSPHORUS

No Drawing. Application filed September 4, 1925, Serial No. 54,547. Renewed January 11, 1930.

This invention relates to a smelting process for the reduction of phosphate bearing materials without the use of carbons by means of elements or compositions thereof whose compounds form a fusible slag with the other oxides than phosphorus which comprise said phosphoric materials.

This invention relates more particularly to the use of silicon or silicon compositions as reducing agents. It further relates to the elimination of the high silicon content of compositions, and particularly compositions of iron and phosphorus, in the production of ferro-phosphorus low in carbon.

A further object of this invention is the utilization of the silicon, present in ferro-phosphorus for instance, as a reducing agent, to replace carbon in the reduction of phosphates, such as tri-calcium phosphate which is commonly called phosphate rock. In this manner high silicon content ferro-phosphorus may be reduced to a low silicon content and its commercial value increased.

In the smelting of phosphatic materials, and particularly phosphate rock, for the production of phosphorus or phosphoric acid, the reaction is generally represented by the following chemical equation:

$$Ca_3(PO_4)_2 + 5C + 2SiO_2 = (CaO)_3(SiO_2)_2 + 5CO + P_2$$

Such an equation also represents the reaction when ferro-phosphorus is made, except the iron, which is added, absorbs phosphorus and produces various iron-phosphides, which vary in their phosphorus content with the percentage of iron which is added.

In carrying out such operations as outlined above, under certain furnace and burden conditions, iron phosphides which are high in silicon may be produced. It was in an effort to reduce the percentage of silicon in such phosphides that I discovered the possibility of using silicon as a substitute for carbon in the reduction of phosphate rock. The equation covering this reaction may be written as follows:

$$Ca_3(PO_4)_2 + 5Si = 4CaSiO_3 + Ca_2SiO_4 + P_2$$

In addition to employing this reaction in reducing the silicon in ferro-phosphorus produced in the smelting of phosphate rock with coke and sand, it may be used to reduce silicon in ferro-phosphorus produced by electric furnace smelting of phosphate rock and coke, in the simultaneous production of calcium carbide and phosphoric acid. There is such a high temperature in the above operation and such an excess of carbon, that it is no infrequent occurrence to produce as high as 6-7% silicon in the ferro-phosphorus. Since such a high percentage of silicon is objectionable, the advantage of its removal is apparent.

As illustrative of my process, as applied to the reduction of phosphatic materials in an electric furnace operating for the production of phosphoric acid and ferro-phosphorus, I propose to substitute metallic silicon, or ferro-silicon or ferro-phosphorus which is high in silicon, for part of the normal reducing matter required. I have found in substituting for carbon in such operation, that it is well to add only 90% of the calculated quantity to replace carbon. This deficiency of reducing matter prevents an excess of silicon in the resultant ferro-phosphorus, and by proper furnace operation, assures less than 0.5% Si in ferro-phosphorus containing 24-25% P.

Having thus described my invention, what I claim as new and desire to secure by Letters Patent, is:—

1. A smelting process for the production of phosphorus compounds low in silicon, which consists in charging a smelting furnace with phosphatic and silicious material and adding a silicon containing composition to replace the carbonaceous material normally added as the reducing agent for such a charge.

2. A smelting process for the elimination of silicon in ferro-phosphorus, which consists in charging phosphatic and silicious materials into a phosphate smelting furnace, and introducing sufficient high silicon ferro-phosphorus to act as the reducing agent for the charge.

3. A smelting process for the elimination of silicon in ferro-phosphorus, which consists in charging an electric smelting furnace with phosphatic and silicious materials, and adding high silicon ferro-phosphorus as a reducing agent in amount equal to substantially 90% of the calculated quantity required to reduce the charge.

In testimony whereof I affix my signature.

HAROLD E. WHITE.